United States Patent [19]

Kawai et al.

[11] Patent Number: 4,891,980
[45] Date of Patent: Jan. 9, 1990

[54] LIQUID LEVEL GAUGE

[75] Inventors: Makoto Kawai; Chikahisa Hayashi; Yoshikazu Hirose; Tatsuya Terayama, all of Aichi, Japan

[73] Assignee: Toyoda Gosei Co., Ltd., Nishikasugai, Japan

[21] Appl. No.: 199,154

[22] Filed: May 26, 1988

[30] Foreign Application Priority Data

May 26, 1987 [JP] Japan .................. 62-129531

[51] Int. Cl.$^4$ .................. G01F 23/76; G01R 33/00
[52] U.S. Cl. .................. 73/290 R; 324/207; 336/183
[58] Field of Search .................. 73/304 C–304 R, 73/290 R, 313; 361/284; 336/219, 213, 224, 183; 324/207, 208, 226

[56] References Cited

U.S. PATENT DOCUMENTS

| Re. 23,844 | 6/1954 | Codon | 73/304 C |
|---|---|---|---|
| 620,027 | 2/1889 | Fuld | 336/219 |
| 2,648,982 | 8/1953 | Condon | 361/284 |
| 2,752,543 | 6/1956 | Smith | 73/304 C |
| 3,074,039 | 1/1963 | Ford | 336/219 |
| 4,627,280 | 12/1986 | Hayashi | 73/290 R |
| 4,730,489 | 3/1988 | Hoekstra | 73/304 C |

Primary Examiner—William A. Cuchlinski, Jr.
Assistant Examiner—Teffrey J. Hohenshell
Attorney, Agent, or Firm—Cushman, Darby & Cushman

[57] ABSTRACT

A liquid level gauge comprising a core disposed inside a liquid container that has a cross sectional configuration that varies in the direction of its height, the core extending in the vertical direction and isolated from the liquid, a coil wound around the core in the direction of the length of the core, the coil comprising a densely wound portion formed at one end of the core and a thinly wound portion wound around the remaining part of the core, a conductor ring disposed around the outer circumference of the coil and is movable in the direction of the length of the coil according to the liquid level inside the container, a detecting portion that detects the change in the inductance of the coil according to the displacement of the conductor ring, a transforming portion that transforms the change in the inductance of the coil to a change in an electric signal, and a display portion that displays the quantity of the liquid inside te container, corresponding to the electric signal, the thinly wound portion having a winding density that varies in steps along the length of the core and the display portion displaying a value proportional to the quantity of the liquid inside the container.

11 Claims, 8 Drawing Sheets

FIG. 2
FIG. 3
FIG. 4
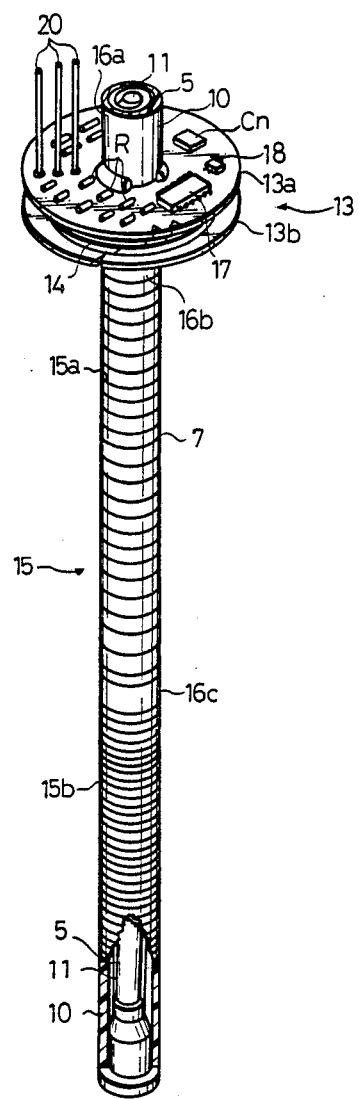
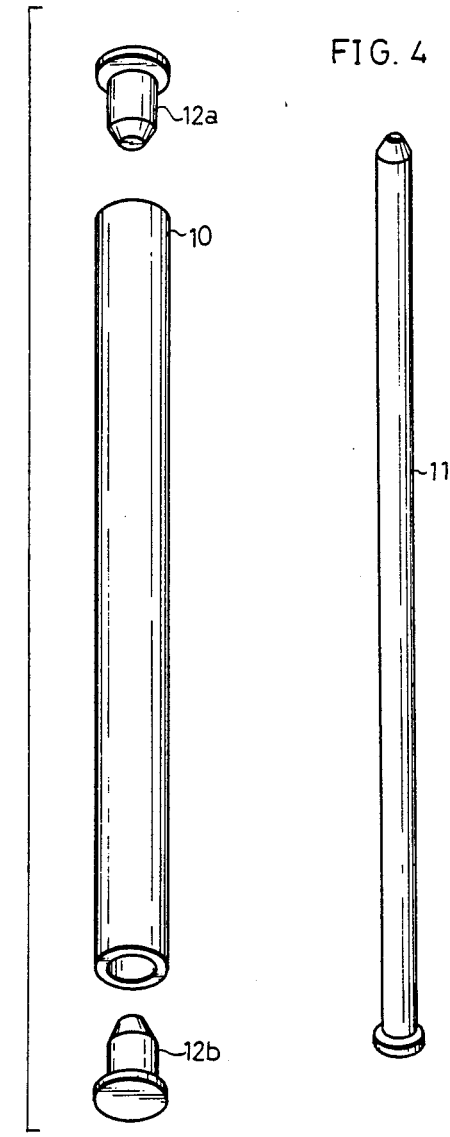

LIQUID LEVEL GAUGE

FIELD OF THE INVENTION

The present invention relates to liquid level gauges used for measuring the volume of liquid substances stored in fuel tanks, and others, by detecting the liquid level of the liquid substance.

DESCRIPTION OF THE RELATED ART

As shown in FIG. 16, a liquid level gauge 57 generally has a sensing portion 101 comprising a core 51 set up inside a liquid container 50 (hereinafter referred to as container) while isolated from the liquid, a coil 52 comprising a densely wound portion 53 formed on one end of the core 51 and a thinly wound portion 54 formed on the remaining portion of the core 51, and a conductor ring 56 floating on the liquid 55 inside the container 50 disposed around this thinly wound portion 54. The liquid level gauge 57 further has a transforming circuit 102 that transforms a change in the inductance of the coil 52 due to the displacement of the conductor ring 56 to a change in voltage or some other quantity, and a display portion 103 that displays the output of the transforming circuit 102 in terms of the quantity of the liquid. (For example, U.S. Pat. No. 4,627,280).

In this liquid level gauge 57, since the coil 52 comprises a densely wound portion 53 and a thinly wound portion 54, the density of the electromagnetic flux crossing the conductor ring 56 is largest near one end of the coil 52, that is, near the densely wound portion 53. As shown in FIG. 17, the thinly wound portion 54 has a uniform winding density. Further, as shown by the straight line a in FIG. 18, the winding density of the densely wound portion 53 and the thinly wound portion 54 of the coil 52 are so designed to obtain a strong linearity between the liquid level h and the inductance L of the coil 52, in other words, between the displacement of the conductor ring 56 and the change in the inductance L of the coil 52. The transforming circuit 102 proportionally, that is, linearly, transforms the inductance L of the coil 52 into an output voltage Vb. Also, an output correcting circuit (not shown) is included in the transforming circuit 102, such that the value displayed by the display portion 103 is linearly related to the output voltage Vb.

In this way, the liquid level gauge 57 mentioned above is capable of accurately measuring the quantity of the liquid inside a container 50, wherein the cross sectional configuration of the container 50 in the direction of its height H is approximately similar throughout.

However, there are various configurations for the container 50. When measuring the quantity of a liquid inside a container 50 that has a cross sectional configuration that varies in the direction of its height H, the relationship between the quantity Q of the liquid and the liquid level h becomes nonlinear, as shown by the curve b in FIG. 19, that is, a change in the quantity Q of the liquid does not correspond proportionally to a change in the liquid level h. Thus, using the same liquid level gauge 57 in a case where the relationship between the change in the liquid level h, that is, the displacement of the conductor ring 56, and the change in the inductance L of the coil 52 is nonlinear will result in an inaccurate measurement of the quantity Q of the liquid displayed by the display portion 103. Therefore, a problem arises in that there will be a discrepancy between the actual quantity Q of the liquid inside the container 50 and the value displayed by the display portion 103.

This problem can be solved by using a device that operates such that the nonlinear relationship mentioned above becomes linear. One scheme is to provide the transforming circuit 102 (which includes the output correcting circuit) or the display portion 103 with a function generating capability by polygonal line approximation, using operational amplifiers (OP amp) and diodes. However, with this approach, the circuit becomes complicated, the technology too advanced, and the number of the required parts increases. As a result, the liquid level gauge 57 becomes expensive. Further, in analog meters, and others, there is a nonlinear relationship between the input voltage and the displayed value, thus, still requiring the same correction by a correcting circuit, as mentioned above.

SUMMARY OF THE INVENTION

The objective of the present invention is to provide a liquid level gauge that can accurately measure the quantity of a liquid inside a container, even for a container with a cross sectional configuration that varies in the vertical direction, without increasing the number of parts of the liquid level gauge.

In order to realize the objective mentioned above, the present invention comprises a core disposed inside a liquid container that has a cross sectional configuration that varies in the vertical direction, this core extending in the vertical direction and isolated from the liquid, a coil wound around the core, this coil comprising a densely wound portion formed on one end of the core and a thinly wound portion formed on the remaining part of the core, a conductor ring disposed around the outer circumference of the coil and movable in the direction of the length of the coil according to the liquid level inside the container, a detecting portion that detects the change in the inductance of the coil corresponding to the displacement of the conductor ring, a transforming portion that transforms the change in the inductance of the coil to a change in an electric signal, and a display portion that displays the quantity of the liquid inside the container, corresponding to the electric signal. The thinly wound portion of the coil is wound in the direction of the length of the core, with the winding density varying in steps, and the display portion is made to display a value proportional to the change in the quantity of the liquid inside the container.

Other objectives of the present invention will become apparent with an understanding of the embodiments discussed later, and the appended claims. Further, many advantages not mentioned in this specification will become obvious to one skilled in the art upon application of the present invention.

BRIEF DESCRIPTION OF THE DRAWINGS

FIG. 1 to FIG. 15 are illustrations related to the present invention;

FIG. 1 is a vertical cross sectional view of an embodiment of the present invention;

FIG. 2 is a perspective view of the principal parts of the embodiment;

FIG. 3 is a perspective view of a pipe made of resin;

FIG. 4 is a perspective view of a shaft;

FIG. 5 and FIG. 6 are perspective views showing other configurations of the shaft;

FIG. 7 is a side view of the principal parts of the embodiment;

FIG. 8 shows the transforming circuit;

FIG. 9 is a graph showing the relationships between the quantity of the liquid and the liquid level, the liquid level and the inductance, the inductance and the output voltage, and the output voltage and the quantity of the liquid;

FIG. 10 is a vertical sectional view showing another configuration of the liquid level gauge, wherein the thinly wound portion of the coil is formed above the densely wound portion;

FIG. 11 is a graph showing the relationships between the quantity of the liquid and the liquid level, and others, which are different from that of the embodiment;

FIG. 12 is a graph showing an example of a display performance of the display portion;

FIG. 13 to FIG. 15 are graphs showing the relationship between the position of the conductor ring and the inductance, as well as the corresponding position of the conductor ring to the thinly wound portion of the coil;

FIG. 16 is a vertical cross sectional view of the related art;

FIG. 17 is a side view of its principal parts;

FIG. 18 is a graph showing the relationship between the liquid level and the inductance;

FIG. 19 is a graph showing the relationship between the liquid level and the quantity of the liquid.

DETAILED DESCRIPTION OF THE PREFERRED EMBODIMENTS

Next, an embodiment of the present invention is described with reference to FIG. 1 to FIG. 9 and FIG. 12 to FIG. 15.

Figure 1:
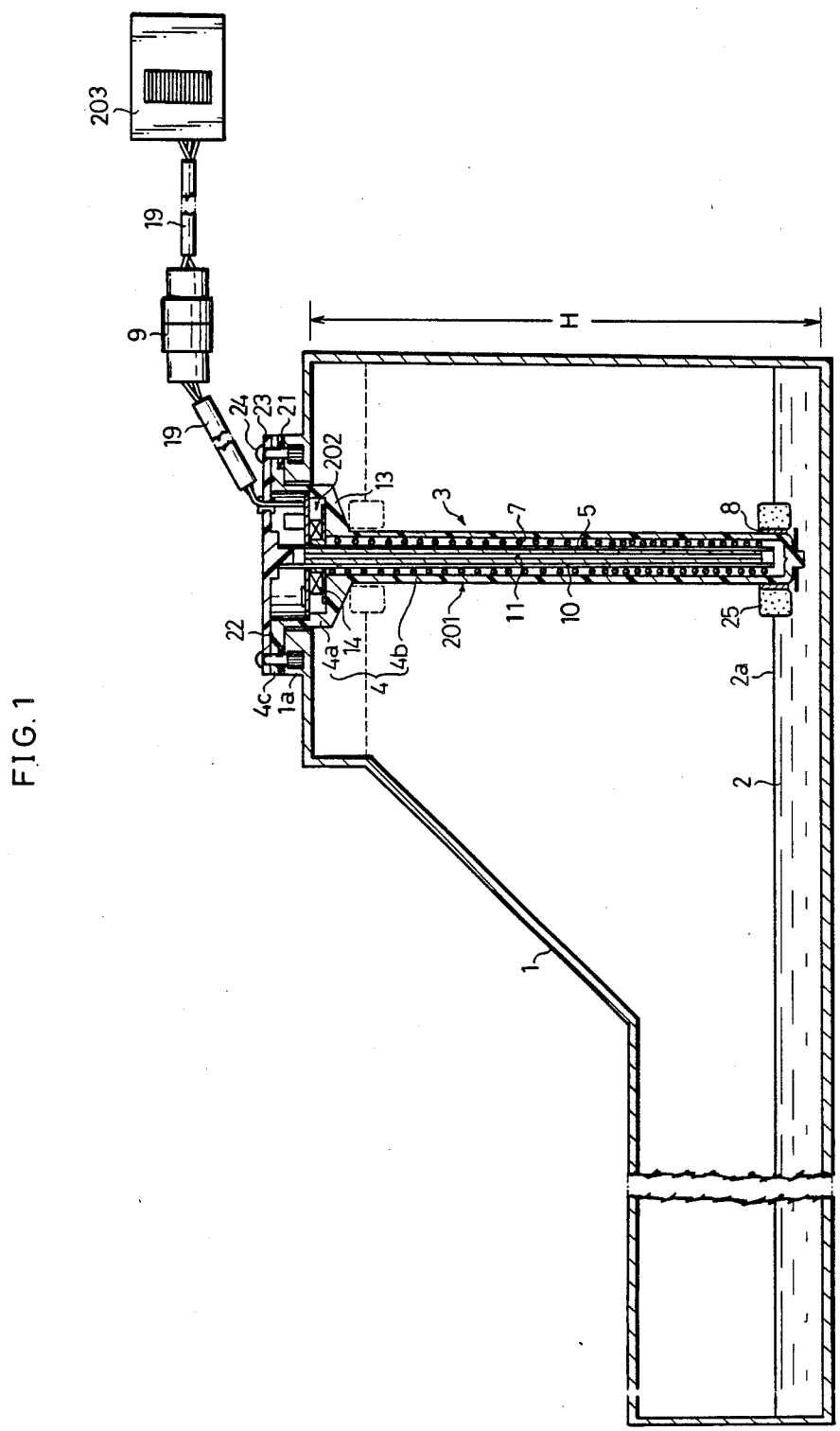

First, the basic structure of the embodiment is described. As shown in FIG. 1, a container 1, for liquids 2 such as gas oil, gasoline, and others, having a cross sectional configuration that varies in the direction of its height H, is attached to a vehicle (not shown).

The container 1 is provided with a liquid level gauge 3 comprising a liquid level detecting portion 201, a transforming circuit 202 that transforms the change in the inductance measured by the detecting portion 201 to a change in voltage or some other quantity, and a display portion 203 that displays the change in voltage from the transforming circuit in terms of the quantity of the liquid.

The detecting portion 201 is supported on the upper portion of the container 1 and comprises a casing 4 which is cylindrical in shape with the bottom closed, a core 5 inserted inside the casing 4, a coil 7 formed by winding a conductor wire around the core 5, and a conductor ring 8 disposed around the outer circumference of the casing 4 such that it is floatably movable.

The casing 4 comprises a relatively narrow guiding portion 4b that guides the conductor ring 8 upward and downward, and a large radius portion 4a formed on the upper part of the guiding portion 4b. The core 5 is contained inside the casing 4 and is isolated from the liquid.

The transforming circuit 202 is provided within the large radius portion 4a and is connected to the display portion 203 provided outside the container 1.

Further, a detailed description of the main parts mentioned above is given. As shown in FIG. 2 and FIG. 3, the core 5 is a cylindrical body formed by spirally rolling a thin sheet made of silicon steel, that has its inner surface covered with a 30 to 50 μm thick inorganic insulating film.

The core 5 is inserted into a pipe 10 made of resin, such as polyacetals, polyamide, and others. The size of the outer radius of the core 5 is regulated and maintained by the surface of the inner circumference of the pipe 10.

Figure 5:
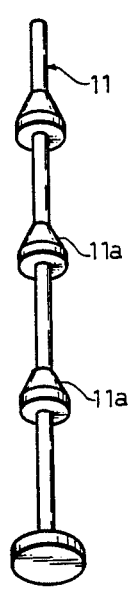
Figure 6:
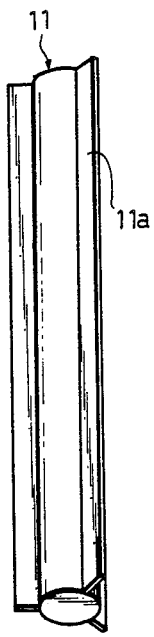

Further, a shaft 11, as shown in FIG. 4, is inserted either from the top or bottom of the core 5 into the pipe 10 made of resin such that the size of the inner radius of the core 5 is regulated and maintained by the surface of the outer circumference of the shaft 11. The shaft 11 can be formed with cone-like protruding portions 11a, at appropriately fixed intervals, in the direction of its length, as shown in FIG. 5, or, it can be formed with fin-like protruding portions 11a, extending in the direction of the length of the shaft 11, at appropriately fixed intervals along its perimeter, as shown in FIG. 6. The upper and lower ends of the pipe 10 made of resin are covered with stoppers 12a, 12b.

As shown in FIG. 1 and FIG. 2, in the large radius portion 4a, a bobbin-shaped portion 13, made up of an upper bobbin part 13a and a lower bobbin part 13b approximately shaped like flat doughnuts, is formed at the upper part of the pipe 10 made of resin.

The densely wound portion 14 of the coil 7 is formed between the upper bobbin part 13a and lower bobbin part 13b of the bobbin-shaped portion 13.

From the densely wound portion 14, the coil 7 is wound continuously below the bobbin-shaped portion 13 to form the thinly wound portion 15, with a winding density approximately 1/20 of that of the densely wound portion 14.

The thinly wound portion 15 is wound in the direction of the length of the pipe 10 made of resin, with the winding density changing either continuously or in steps.

Figure 9:
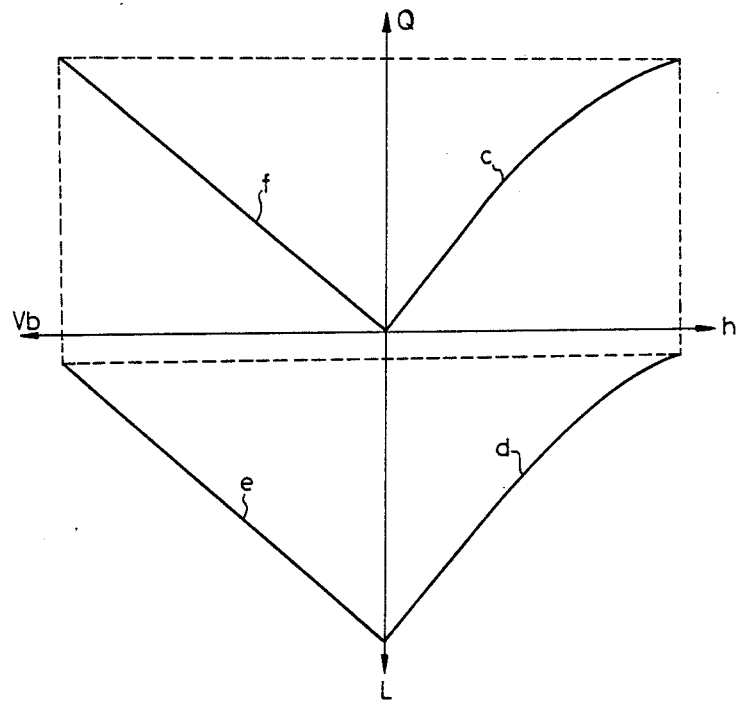

In this embodiment, referring to the curve c showing the relationship between the liquid level h and the quantity Q of the liquid, on the upper right hand portion of FIG. 9, and the curve d showing the relationship between the liquid level h and the inductance L of the coil 7, on the lower right hand portion of the same figure, the degree of the variation of the winding of the thinly wound portion 15 is determined by letting the differential coefficients of the respective curves at the same liquid level h satisfy the following equation (1), $$|dQ/dh| = |dL/dh| \tag{1}$$

In equation (1), even in the case where the absolute value of dQ/dh is not exactly equal to the absolute value of dL/dh, as long as both values agree to a resonably approximately degree, in using the liquid level meter 3, the error between the quantity of the liquid displayed by the display portion 203 and the actual quantity Q of the liquid is an essentially permissible error. The range, in terms of the quantity Q of the liquid, is 1/50 or less, of the capacity of the container 1.

Figure 13:
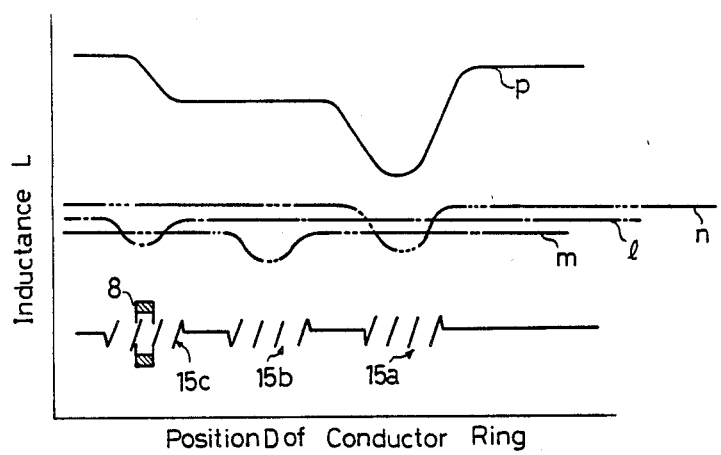
Figure 14:
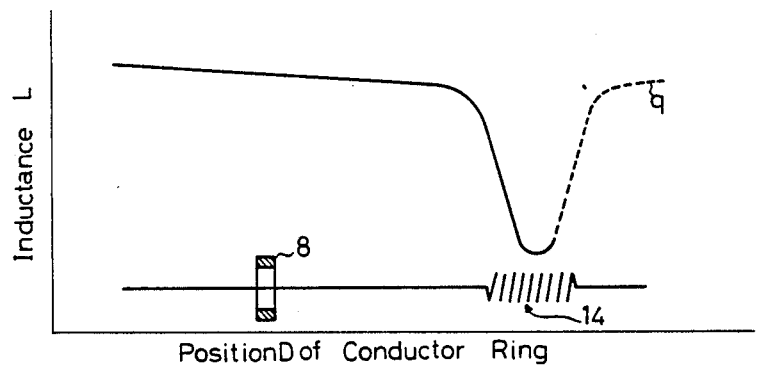
Figure 15:
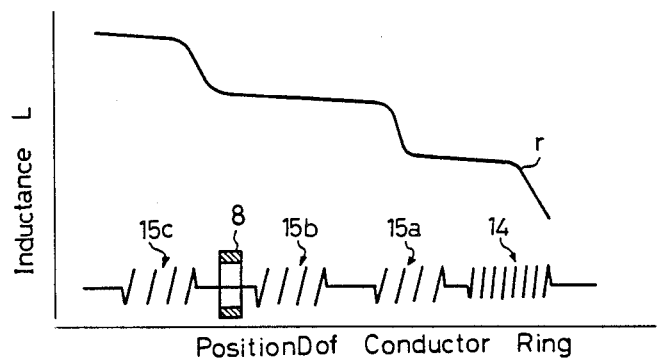
Figure 17:
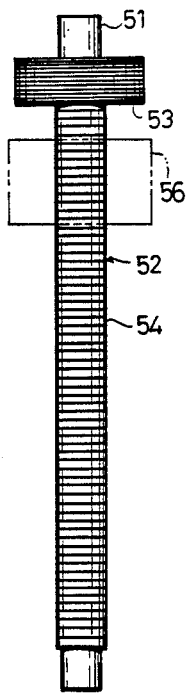
Figure 18:
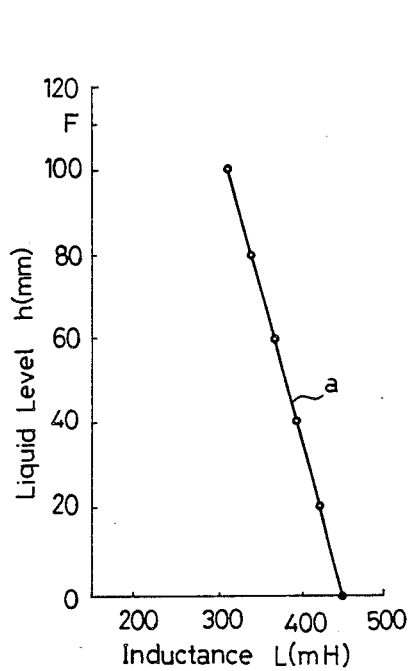
Figure 19:
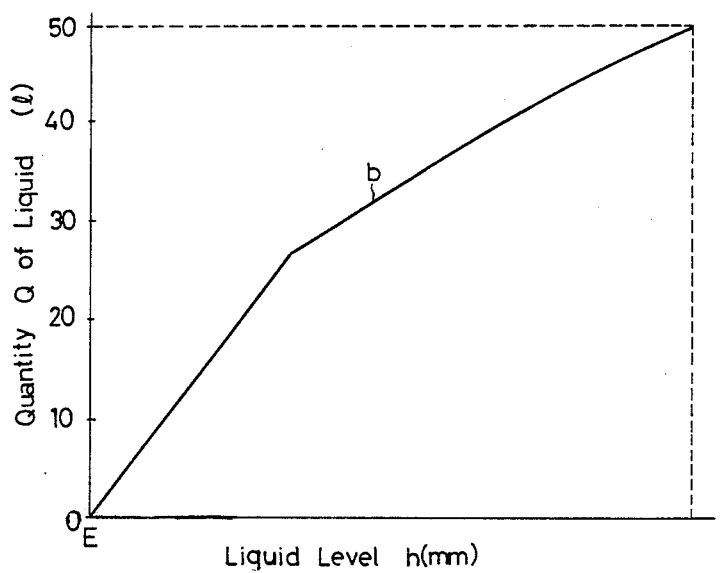

The general design of the densely wound portion 14 and the thinly wound portion 15 of the coil is explained with reference to FIG. 13 to FIG. 15.

The thinly wound portion 15 comprises a first thinly wound portion 15a, a second thinly wound portion 15b, and a third thinly wound portion 15c. The changes in the inductances L of the first, second and third thinly wound portions 13a, 13b, 13c, relative to the displacement of the conductor ring 8 are shown by the curves l, m, and n, represented by the one-dot chain line, two-dot chain line, and three-dot chain line, respectively, in FIG. 13. The overall change in the inductance L of the thinly wound portion 15, relative to the displacement of the conductor ring 8, is shown by the curve p represented substantially by the solid line. The overall change in the inductance L of the coil 7, corresponding to the position D of the conductor ring 8 along the axis of the coil 7, as shown by the curve r in FIG. 15, can be obtained by combining the change in the inductance L of the thinly wound portion 15 relative to the displacement of the conductor ring 8, obtained earlier, and the change in the inductance L of the densely wound portion 14 relative to the displacement of the conductor ring 8, shown by the curve q in FIG. 14.

Thus, the relationship between the inductance L and the position D of the conductor ring 8 can be realized in a variety of ways by having the coil 7 comprise a densely wound portion 14 and a thinly wound portion 15, making the relationship between the inductance L of the coil 7 and the position D of the conductor ring 8 along the direction of the axis of the coil have a 1:1 correspondence, and further making the winding density of the thinly wound portion 15 change in steps.

In the actual design, however, the effect of the core 5 must be considered. Thus, the inductance L is not merely a simple combination of the inductances L of the densely wound portion 14 and the thinly wound portion 15 of the coil 7. More accurately, the following Biot-Savart law is applied as a basic equation;

$$S = \frac{\mu 1}{1\pi} \int \frac{d(S \times r)}{|r|} \quad (2)$$

$\mu$: magnetic permeability
dS: micro-line element vector of current loop
dr: position vector
I: loop current By performing a three dimensional analysis using the equation above with respect to the position D of the conductor ring 8 along the direction D of the axis of the coil, the magnetic flux at every point along the direction of the axis of the coil can be found by solving the following simultaneous equations (3) and obtain $\Phi(D)$;

$$[\Phi] = [A][\Phi] + [\Phi_o] \quad (3)$$

$\Phi_o$: magnetic flux due to the coil
A: geometric constant
[ ] stands for a matrix.

Figure 7:
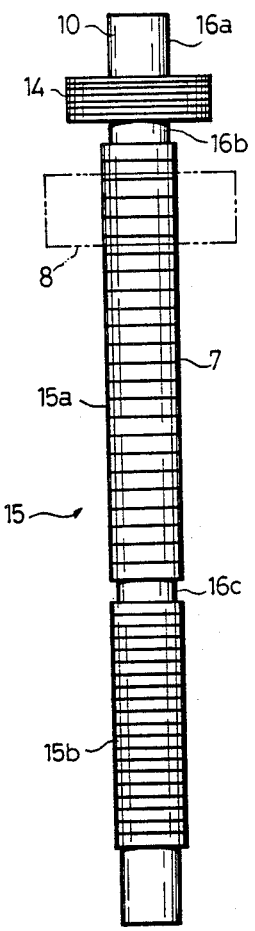

The inductance L corresponding to the position D of the conductor ring 8 along the direction D of the axis of the coil can be found by substituting $\Phi(D)$ in the following equation (4);

$$L = \frac{1}{i} \int n(D) \cdot \Phi(D) \, dD \quad (4)$$

n(D): number of turns of the coil at every point along the direction of its axis
i: current flowing through the coil In this embodiment, as shown in FIG. 7, the thinly wound portion 15 comprises a first thinly wound portion 15a and a second thinly wound portion 15b, each having a different winding density. There are portions 16b, 16c between the densely wound portion 14 and the first thinly wound portion 15a, and between the first thinly wound portion 15a and the second thinly wound portion 15b, respectively, where the coil 7 is not wound.

Further, the winding density of the densely wound portion 14 is 1250 turns/4 mm, the winding density of the first thinly wound portion 15a is 1000 turns/70 mm, and the winding density of the second thinly wound portion 15b is 700 turns/40 mm.

The pipe 10 made of resin protrudes above the densely wound portion 14, forming an unwound portion. However, it is desirable not to make the pipe 10 made of resin protrude. In so doing, the space covered by the large radius portion 4a can be reduced and the full range can be lengthened.

As shown in FIG. 2, the upper bobbin part 13a itself is a printed circuit board made of glass fiber reinforced epoxy resin. The transforming circuit 202, shown in FIG. 8, made up of the printed circuit and resistors R, flat package IC 17, transistor 18, condenser Cn, and others, connected to the printed circuit, is formed on this printed circuit board.

Figure 8:
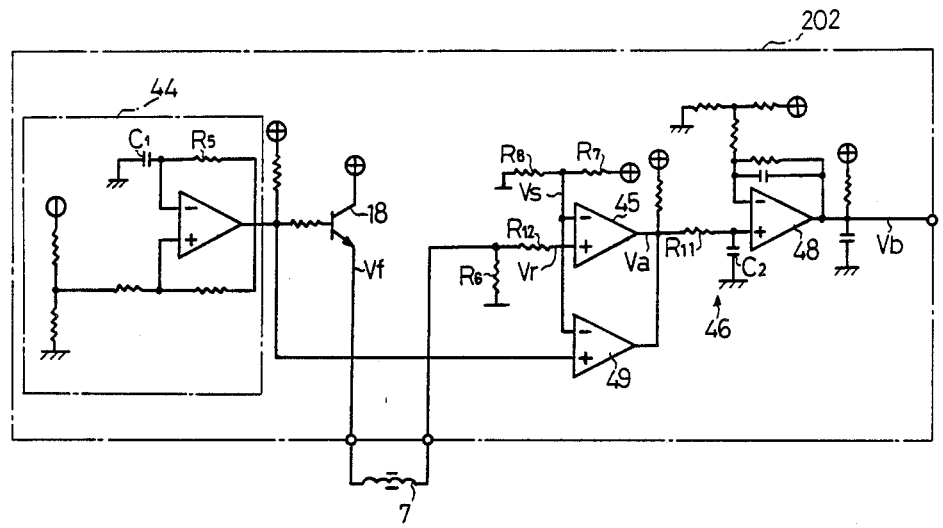

The transforming circuit 202 comprises a L-V transforming circuit. As shown in FIG. 8, the square wave output of the oscillator 44 is used as an input to the LR series circuit. In the LR series circuit, the inductance is detected in terms of the time constant, and is output in terms of the change in voltage.

The oscillator 44, that has an oscillation frequency which is determined by the condenser C1 and the resistor R5, is connected to the coil 7 via the transistor 18. The oscillator 44 is adapted to output the square wave of the voltage Vf. A resistor R6 is connected to the output terminal of the coil 7, and with the coil 7, makes up a LR series circuit. This LR series circuit is connected to the noninverting input terminal of the first comparator 45 via the resistor 12. The source voltage is divided between the two resistors R7, R8. The resulting standard voltage Vs is applied on the inverting input terminal of the first comparator 45.

The output terminal of the first comparator 45 is connected to the output terminal of the second comparator 49. The square wave voltage from the oscillator 44 is applied on the noninverting input terminal of the second comparator 49 while the standard voltage Vs is applied on the inverting input terminal.

Further, the output terminal of the first comparator 45 is connected to the smoothing circuit 46 made up of a resistor R11 and a condenser C2. The output terminal of the smoothing circuit 46 is connected to the noninverting input terminal of the third comparator 48. From the third comparator 48, the output voltage Vb, of the transforming circuit 202, is input to the display portion 203.

In this embodiment, the transforming circuit 202 exhibits the characteristic of a linear relationship between the inductance L and the output voltage Vb.

A precision temperature sensitive resistor is used for the resistor R6. For all other resistors, a metallic film resistor is used. In addition, a polypropylene condenser is used for the condenser C1, and an electrolytic condenser made of aluminum is used for the condenser C2.

Pins 20, that conduct electricity to the coil 7 and the transforming circuit 202, are provided on the upper bobbin part 13. The pins 20 are connectable to the lead wires 19 and a connector 9 connects the lead wires 19 (refer to FIG. 2).

The lead wires 19 are connected to the display portion 203 such as a meter, and others. The output voltage Vb from the transforming circuit 202 is displayed by the display portion 203, either as an analog display such as a bar graph, and others, or as a digital display such as a seven segment display, and others, in terms of the quantity Q of the liquid.

The upper portion of the casing 4 is furnished with a flange 4c; the flange 4c is placed on the opening 1a of the container 1, with a gasket 21 in between. A cover 23 is fixed over the flange 4c with screws 24, with an O ring 22 in between, fastening the casing 4 to the container 1. The conductor ring 8 is attached to a float 25, enabling it to float on the liquid 2.

Next, the operation and efficiency of the present embodiment is described. The level h of the surface 2a of the liquid 2 stored inside the container 1 changes according to the quantity Q of the liquid. Since the cross sectional configuration of the container 1 varies in the direction of its height, the quantity Q of the liquid and the liquid level h are related in a nonlinear fashion, as shown by the curve c in FIG. 9.

When the surface 2a of the liquid changes, the conductors ring 8 attached to the float 25 moves up or down.

Since the thinly wound portion 15 and the densely wound portion 14 of the coil 7 are wound in order in the vertical direction, inside the casing 4 of the liquid level gauge 3, from the bottom upwards, the magnetic flux distribution becomes nonsymmetrical, and the density of the magnetic flux crossing the conductor ring 8 is largest at the position shown by the dotted lines in FIG. 1. The inductance L of the second thinly wound portion 15b, first thinly wound portion 15a, densely wound portion 14, and the conductor ring 8 decreases as the conductor ring 8 moves upward, in other words, as the liquid level h becomes higher.

However, in the embodiment, since the first thinly wound portion 15a and the second thinly wound portion 15b have winding densities that differ in steps, the inductance L and the liquid level h are related in a nonlinear fashion, as shown by the curve d on the lower right hand portion of FIG. 9, the curve d and the curve c satisfy equation (1), and the inductance L and the output voltage Vb of the transforming circuit 202 are linearly related, as shown on the lower left hand portion of FIG. 9. For these reasons, the output voltage Vb and the quantity Q of the liquid are proportionally related, as shown by the straight line f on the upper left hand portion of FIG. 9.

Figure 12:
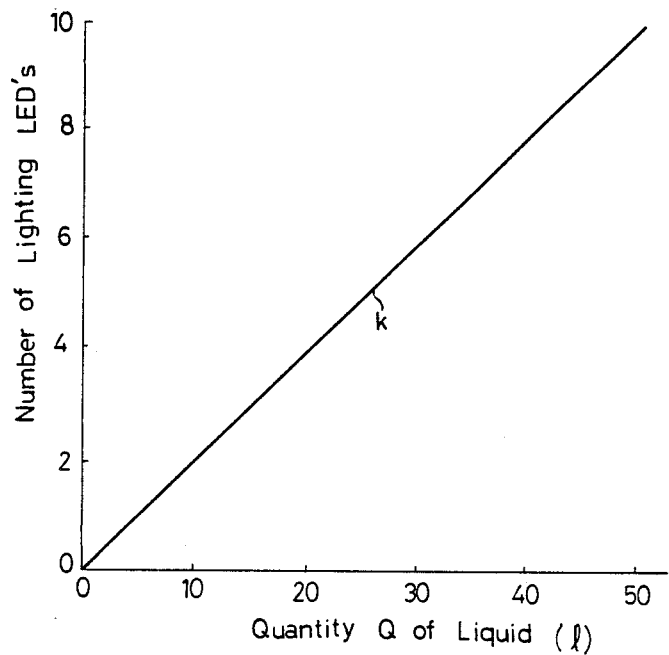

Therefore, for example, if the number of flashing LED's is increased or decreased according to the output voltage Vb, since the number of lighting LED's and the quantity Q of the liquid inside the container 1 are proportionally related, as shown by the straight line k in FIG. 12, the quantity of the liquid can be displayed in terms of the number of lighting LED's.

Thus, in the present embodiment, by merely making the winding density of the thinly wound portion 15 in the related art non-uniform and regulating its inductance properties, the quantity Q of the liquid inside the container 1 that has a cross sectional configuration that varies in the direction of its height, can be measured accurately, without having to increase the number of parts of the liquid level gauge.

The change in the inductance L is input to the display portion 203 in terms of the change in the output voltage Vb, according to the following.

The square wave voltage Vf from the oscillator 44 is input to the LR series circuit via the transistor 18. The output from this LR series circuit is a voltage Vr that rises with a delay after the high level voltage of the voltage Vb is input, or falls with a delay after the low level voltage of the voltage Vb is input. The voltage Vr becomes an input to the noninverting input terminal of the first comparator 45, while the standard voltage Vs becomes an input to the inverting input terminal. When the voltage Vr is larger than the voltage Vs, a square wave voltage Va is output from the comparator 45. However, when the output voltage Vf of the oscillator 44 is at the low level, the voltage Va of the first comparator 45 is absorbed by the output terminal of the second comparator 49; when it is not absorbed by the second comparator 49, that is, when the output voltage Vf of the oscillator 44 is the high level, the voltage Va is input to the smoothing circuit 46. The smoothed voltage from the smoothing circuit 46 is zero regulated by the third comparator 48 and is input to the display portion 203 as the output voltage Vb of the transforming circuit 202.

The present invention is not limited to the embodiment described above, for example, it can be applied in the following realizations.

Figure 10:
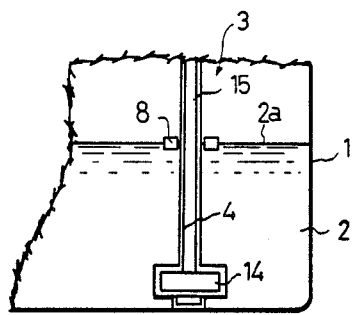
Figure 16:
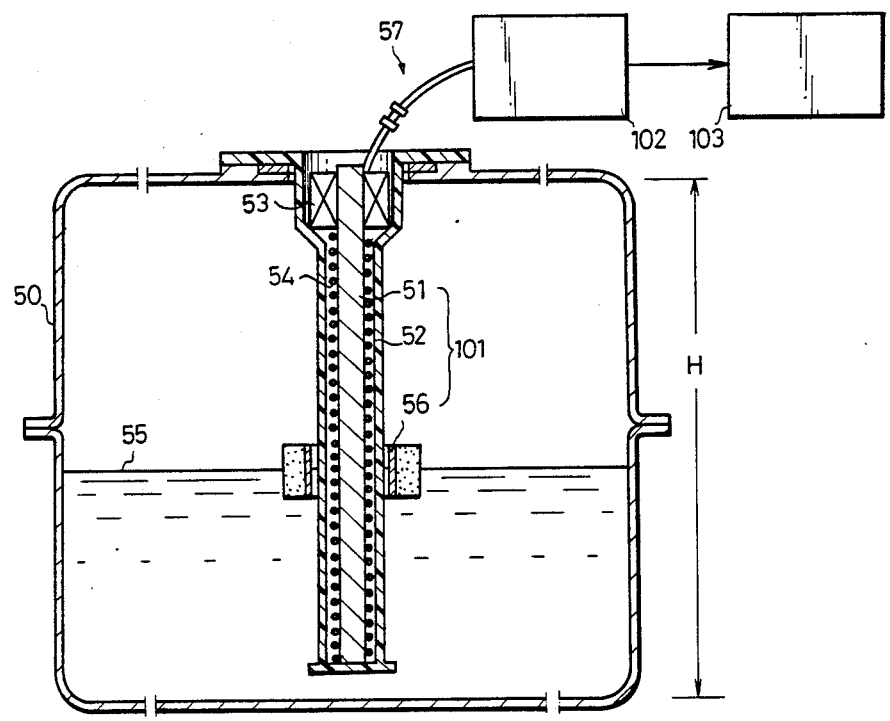
FIG. 16 to FIG. 19 are illustrations pertaining to a related art.

(1) As shown in FIG. 10, the liquid level gauge 3 can be positioned inside the container 1 with the thinly wound portion 15 formed above the densely wound portion 14, the inductance L increasing as the liquid level h becomes higher. In this case, the relationship between the differential coefficient of the quantity Q of the liquid with respect to the liquid level h, dQ/dh, and the differential coefficient of the inductance L of the coil 7 with respect to the liquid level h, dL/dh, must be made linear or approximately linear.

(2) In the described embodiment, a transforming circuit 202, in which the inductance L and the output voltage Vb are linearly related, was used. A transforming circuit 202, in which the inductance L and the output voltage Vb are not linearly related, as shown by the curve j on the lower left hand portion of FIG. 11, can also be used.

Figure 11:
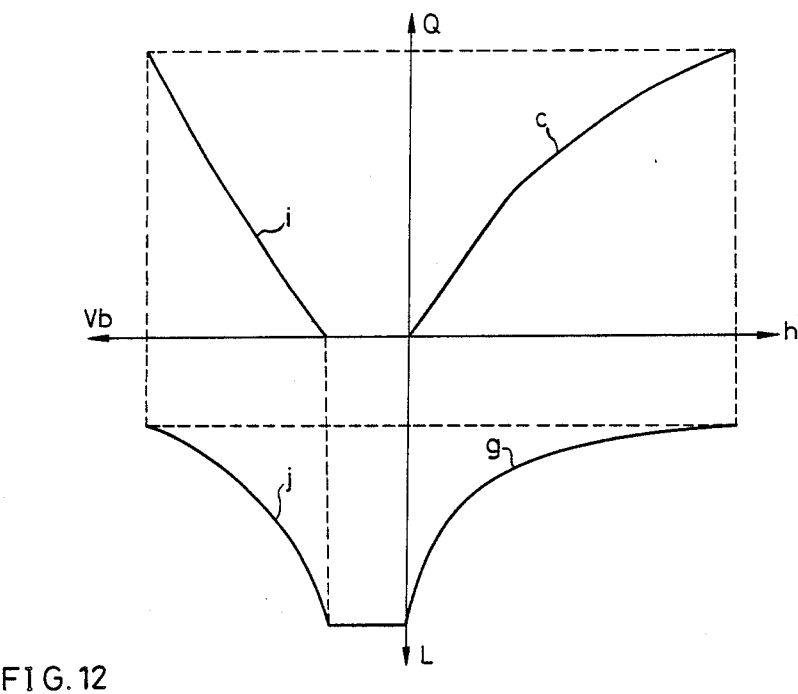

However, in this case, the winding density of the thinly wound portion 15 is made to differ from that of the described embodiment, and the output voltage Vb must increase monotonically with the increase in the quantity Q of the liquid, both being related in an approximately linear fashion, as shown on the upper left hand portion of FIG. 11, as well as satisfy the following equation (5)

$$Q = f\{v(L)\} = c(h) \qquad (5)$$

where $Vb = v(L)$ and $L = g(h)$.

In addition, at the display portion 203, in the case where the input voltage and the displayed value are not linearly related, as in the manner mentioned previously, the relationship between the quantity Q of the liquid and the displayed value Qs must be made linear by means of a coil winding adjustment.

Further, when the output voltage Vb, used as an input to the display portion 203, and the displayed value Qs are not linearly related, the winding density of the thinly wound portion 15 is made to differ from that of the embodiment such that the following equation (6) is satisfied, $$Q = f\{v(Vb)\} = c(h) \qquad (6)$$

where $Qs = k(Vb)$, $Vb = v(L)$, and $L = g(h)$. k represents a property of the input voltage Vb and the displayed value Qs of the display portion 203.

(3) The winding density of the thinly wound portion 15 can be made to change in a continuously non-uniform manner, in the direction of the length of the core 5.

(4) Aside from a change in voltage from the transforming circuit 202, a change in current or frequency can be used as an input to the display portion 203, with the display portion 203 outputting the quantity Q of the liquid.

(5) Aside from adjusting the densely wound portion 14 and the thinly wound portion 15 in order to adjust the change in the inductance L, and the coil 7 that includes the conductor ring 8, an application can also include changes in the length and thickness of the conductor ring 8, the shape and radius of the core, and others.

(6) The liquid level gauge 3 of the present invention is efficient in measuring the quantity Q of the liquid inside various containers 1 that have cross sectional configurations that vary in the direction of their heights. For example, in vehicles wherein loading space is limited, especially in passenger cars, the liquid level gauge can be used as a capacity meter for fuel tanks.

Inasmuch as it is apparent that the present invention can be realized in a wide range of constructions without departing from its essence, the realizations of the present invention are not limited to those stated in the appended claims.

What is claimed is:

1. A liquid level gauge, comprising:
    a core extending in the vertical direction and disposed inside a liquid container having a cross sectional configuration varying in the vertical direction, said core being isolated from the liquid,
    a coil wound in the direction of the length of said core, said coil comprising a densely wound portion formed at one end of said core, and a thinly wound portion formed on the remaining portion of said core,
    a conductor ring disposed around the outer circumference of said coil and movable in the direction of the length of said coil according to the liquid level inside said container,
    detecting means for detecting the change in the inductance of said coil according to the displacement of said conductor ring,
    transforming means for transforming said change in the inductance of said coil into a change in an electric signal, and
    display means for displaying the quantity of the liquid inside said container, corresponding to said electric signal,
    said thinly wound portion having a winding density varying in steps along the direction of the length of said core,
    said display means being made to display a display value proportional to the change in the quantity of the liquid inside said container,
    said core being a cylindrical body formed by spirally rolling a sheet of silicon steel that is coated on both sides with an inorganic insulating film.

2. A liquid level gauge, as set forth in claim 1, wherein the winding density of said thinly wound portion is determined such that the absolute value of the differential coefficient of the quantity of the liquid with respect to the liquid level, dQ/dh, and the absolute value of the differential coefficient of the inductance of the coil with respect to the liquid level, dL/dh, are approximately equal.

3. A liquid level gauge, as set forth in claim 1, that includes a pipe, made of synthetic resin, to accomodate said core thereinside as well as to regulate the outer radius of said core with an inner surface thereof.

4. A liquid level gauge, as set forth in claim 3, that includes a shaft inserted into said core and regulating the inner radius of said core with an outer surface thereof.

5. A liquid level gauge, as set forth in claim 4, wherein said shaft has a plurality of cone-shaped protrusions at fixed intervals along the length thereof.

6. A liquid level gauge, as set forth in claim 4, wherein said shaft has a plurality of protrusions extending in the axial direction thereof at fixed intervals along the circumference thereof.

7. A liquid level gauge, as set forth in claim 4, wherein said pipe has a pair of stoppers for covering both ends of said pipe.

8. A liquid level gauge, as set forth in claim 1, wherein said thinly wound portion comprises a first thinly wound portion and a second thinly wound portion, each having a different winding density.

9. A liquid level gauge, comprising:
    a core extending in the vertical direction and disposed inside a liquid container having a cross sectional configuration varying in the vertical direction, said core being isolated from the liquid,
    a coil wound in the direction of the length of said core, said coil comprising a densely wound portion formed at one end of said core, and a thinly wound portion formed on the remaining portion of said core,
    a conductor ring disposed around the outer circumference of said coil and movable in the direction of the length of said coil according to the liquid level inside said container,
    detecting means for detecting the change in the inductance of said coil according to the displacement of said conductor ring,
    transforming means for transforming said change in the inductance of said coil into a change in an electric signal,
    display means for displaying the quantity of the liquid inside said container, corresponding to said electric signal, and
    a bobbin-shaped portion having a radius much larger than that of said core, disposed at one end of said core, and having a recessed portion used in forming said densely wound portion,
    said thinly wound portion having a winding density varying in steps along the direction of the length of said core, said display means being made to display a display value proportional to the change in the quantity of the liquid inside said container.

10. A liquid level gauge, as set forth in claim 9, wherein a surface of said bobbin-shaped portion at said end of said core is a printed circuit board, said transforming means being formed on said printed circuit board.

11. A liquid level gauge, as set forth in claim 10, wherein said transforming means is an inductance to voltage transforming circuit comprising an oscillator, a first comparator connected to said oscillator via an LR series circuit including said coil, a second comparator connected to said oscillator in parallel with said first comparator, the output terminal of said second comparator being connected to the output terminal of said first comparator, and a third comparator connected to the output terminal of said first comparator through a smoothing circuit.

* * * * *